United States Patent
Yashiki et al.

(10) Patent No.: US 8,408,770 B2
(45) Date of Patent: Apr. 2, 2013

(54) BACK COVER AND METHOD OF ASSEMBLING BACK COVER

(75) Inventors: Satoru Yashiki, Shizuoka (JP); Masato Watanabe, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 652 days.

(21) Appl. No.: 12/704,632

(22) Filed: Feb. 12, 2010

(65) Prior Publication Data

US 2010/0214800 A1    Aug. 26, 2010

(30) Foreign Application Priority Data

Feb. 20, 2009    (JP) .................... 2009-038519
Jun. 10, 2009    (JP) .................... 2009-139438

(51) Int. Cl.
B60Q 1/00    (2006.01)
B60Q 3/00    (2006.01)
F21V 11/00    (2006.01)
F21V 15/01    (2006.01)

(52) U.S. Cl. ...................... 362/546; 362/548

(58) Field of Classification Search .......... 362/546–549, 362/507, 374, 375, 267
See application file for complete search history.

(56) References Cited

U.S. PATENT DOCUMENTS

2002/0067617 A1    6/2002    Imachi et al.
2006/0239022 A1*   10/2006   Inaba et al. .................. 362/538
2007/0133220 A1*   6/2007    Watanabe et al. ............. 362/538
2007/0177401 A1*   8/2007    Nakabayashi ................ 362/548
2008/0266892 A1    10/2008   Yashiki et al.

FOREIGN PATENT DOCUMENTS

| DE | 196 00 638 | 7/1996 |
| EP | 0 854 315 | 7/1998 |
| JP | 2002-367413 | 12/2002 |
| JP | 2008-277008 | 11/2008 |

OTHER PUBLICATIONS

European Search Report for Application No. 10153956.7, dated Jun. 14, 2010 (7 pages).

* cited by examiner

*Primary Examiner* — Anh Mai
*Assistant Examiner* — Kevin Quarterman
(74) *Attorney, Agent, or Firm* — Fish & Richardson P.C.

(57) ABSTRACT

A back cover (16) is attached to a cover mounting portion (5) of a lamp body (2) defining a lamp chamber (4) of a vehicle lamp (1). The back cover (16) is provided with a cover main body (19) to which a connection terminal (20) is partially embedded and a metallic case member (18) to which a circuit board (29, 30) is mounted. A seal groove (27) is formed on one of the cover main body (19) the case member (18).
An elongated seal projection (18b) formed on the other of the cover main body (19) the case member (18). The elongated seal projection (18b) is fitted in the seal groove (27) and bonded to the seal groove (27), so that the elongated seal projection (18b) is fixed to the seal groove (27).

8 Claims, 7 Drawing Sheets

BACK COVER AND METHOD OF ASSEMBLING BACK COVER

BACKGROUND OF THE INVENTION

1. Field of the Invention

The present invention relates to a back cover and a method of assembling back cover method. The invention relates more particularly to a technical field in which a cover main body and a case member are connected together by an elongated seal projection which is bonded in such a state the projection is fitted in a seal groove so as to realize an improvement in mounting strength with which the case member is mounted on the case main body as well as an improvement in waterproofness therebetween.

2. Background Art

There are vehicle lamps in which a light source and an illumination circuit (a ballast) for driving the light source are disposed in a lamp chamber defined by a front cover and a lamp body (for example, refer to JP-A-2008-277008).

A vehicle lamp described in JP-A-2008-277008 has a cover main body which is formed from a resin material and a heat dissipating member which is formed of a metallic material and functions as a case member, and a heat dissipating member mounting portion formed into a frame-like shape is provided on the cover main body. The heat dissipating member is fitted inside the heat dissipating member mounting portion and is mounted on the cover main body by an outer circumferential portion thereof being bonded, for example.

However, in the back cover described in JP-A-2008-277008, since the heat dissipating member (the case member) is mounted on the cover main body by being fitted in the heat dissipating member mounting portion and being bonded therein, there is a fear that a gap is produced between an inner circumferential surface of the heat dissipating member mounting portion and an outer circumferential surface of the heat dissipating member.

When such a gap is produced, there is caused such a drawback that a light source illumination circuit is badly affected or that a front cover is clouded up by water which infiltrates a lamp chamber whose waterproofness is reduced. In addition, there is caused such a drawback that the mounting strength with which the case member is mounted on the cover main body is reduced to thereby produce looseness or that the heat dissipating member falls from the cover main body.

SUMMARY OF THE INVENTION

One or more embodiments of the present invention provide a back cover and a back cover assembling method in which mounting strength of a case member to a case main body is improved and waterproofness of a lamp chamber is also improved.

In accordance with one or more embodiments of the invention, in a back cover 16 to be attached to a cover mounting portion 5 of a vehicle lamp 1 in which a light source 9 is disposed in a lamp chamber 4 defined by a lamp body 2 on which said cover mounting portion 5 having a mounting opening 5a is provided at a rear end portion of the lamp body 2 and a front cover 3 which covers a front of the lamp body 2, the back cover 16 is provided with: a cover main body 19 formed from a resin material and including a first fitting portion 21 provided on a front end side of the cover main body 19 and adapted to fit in the cover mounting portion 5 and a second fitting portion 24 provided on a rear end side of the cover main body 19; a connection terminal 20 formed of a metallic material and partially embedded in the cover main body 19 so as to be integrally formed with the cover main body 19; a metallic case member 18 fitted in the second fitting portion 24 and including a mounting recess portion 18a made to open forwards; a circuit board 29, 30 disposed within the mounting recess portion 18a and connected with the connection terminal 20; an electronic component 32 disposed within the mounting recess portion 18a and connected with the circuit board 29, 30; a power supply terminal portion 20d provided on a part of the connection terminal 20 and adopted to be connected with a light source side connector 14 for supplying electric power to the light source 9; a connector terminal portion 20b provided on another part of the connection terminal 20 and adapted to be connected with a power supply side connector for receiving electric power from a power supply side; a connector frame portion 25 provided on the cover main body and adopted to cover the connector terminal portion 20b from a circumference of the connector terminal portion 20b; a seal groove 27 formed on one of the second fitting portion 24 and the case member 18 to open forwards or rearwards and extending in a circumferential direction; and an elongated seal projection 18b formed on the other of the second fitting portion 24 and the case member 18 to project rearwards or forwards and extending in the circumferential direction. The elongated seal projection 18b is fixed to the seal groove 27 in a condition where the elongated seal projection 18b is fitted in the seal groove 27 and bonded to the seal groove 27.

In the above structure, good sealing property is secured between the cover main body and the case member, and hence infiltration of water (vapor) contained in the atmosphere or outside water into the illumination circuit or the lamp chamber can be prevented, whereby not only can an operation failure of the illumination circuit for the light source be prevented, but also fogging of the front cover can be prevented.

The back cover may further includes a rising wall portion 28 provided on an outer circumferential side of the connector frame portion 25 and covering at least a part of a circumference of the connector frame portion 25.

In the above structure, the hands of an assembler or other surrounding objects are never brought into contact with the connector frame portion and the connector terminal portion which is positioned in the interior of the connector frame portion when the back cover is mounted on the cover mounting portion of the lamp body or the vehicle lamp is mounted on a vehicle body, thereby making it possible to prevent any damage to the connector frame portion and the connector terminal portion.

The back cover may further includes an insertion hole 23e formed in the cover main body 19 and penetrating through the cover main body 19 in a front-rear direction; a screw inserting hole 20e formed in the connection terminal 20 and positioned in association with the insertion hole 23e; a screwing hole 18e formed in the case member 18 and positioned in association with the insertion hole 23e; and a metallic shield plate 33 adapted to cover the connection terminal 20 from a front thereof. The shield plate 33 may be fixed to the case member 18 by a screw 100 which is inserted through the screw inserting hole 20e and the insertion hole 23e to be screwed into the screwing hole 18e.

In the above structure, generation of electromagnetic noise in the back cover can re reduced.

The back cover may further includes a component disposing portion 23b provided in the cover member 19; and an electronic component 26 having a lead 26a and disposed in the component disposing portion 23b. The lead 26a of the electronic component 26 may be connected to the connection terminal 20 by welding.

In the above structure, not only can an improvement in connecting strength with which the lead of the electronic component is connected with the connection terminal be realized, but also an improvement in conductivity to a contact resistance can be realized.

The back cover may further includes a positioning hole 23d formed in the cover main body 19; and a positioning pin 18f provided on the case member 18 and inserted in the positioning hole 23d.

In the above structure, an improvement in positioning accuracy of the case member to the cover main body can easily be realized.

The back cover may further includes a chip component 31 mounted on one surface of the circuit board 29, 30. The other surface of the circuit board 29, 30 may be formed into a flat plane. The circuit board 29, 30 may be mounted on the case member 18, and the other surface of the circuit board 29, 30 is in surface contact with the case member 18.

In the above structure, the heat transfer coefficient of heat generated in the circuit board to the case member is high, thereby making it possible to realize an improvement in heat dissipating performance of the back cover.

The back cover may further includes a plurality of engagement projecting portions 21a provided at a front end portion of the first fitting portion 21 so as to be positioned spaced apart from each other in a circumferential direction; and a restricting projecting portion 21b projecting forwards and provided at least one of the plurality of engagement projecting portions 21a. Further, the cover mounting portion 5 of the lamp body 2 may include a plurality of inserting cutouts 6a into which the plurality of engagement projecting portions 21a are inserted individually from a rear thereof and a plurality of engagement portions 6 with which the plurality of engagement projecting portions 21a are brought into engagement when the cover main body 19 is rotated in the circumferential direction in such a state that the plurality of engagement projecting portions 21a are inserted individually into the plurality of inserting cutouts 6a from the rear thereof.

In the above structure, the back cover can be prevented from being mounted on the cover mounting portion in an incomplete condition when the back cover is oriented improperly towards the cover mounting portion.

Furthermore, in accordance with one or more embodiments of the present invention, in a back cover to be attached to a cover mounting portion 5 of a vehicle lamp in which a light source 9 is disposed in a lamp chamber 4 defined by a lamp body 2 on which said cover mounting portion 5 having amounting opening 5a is provided at a rear end portion of the lamp body 2 and a front cover 3 which covers a front of the lamp body 2, the back cover is manufactured by: providing a seal groove 27 on one of a cover main body 19 and a metallic case member 18 to open forwards or rearwards, wherein said cover main body 19 is integrally molded with a connection terminal 20 made of a metallic material in such a state that the connection terminal 20 is mostly embedded in the cover main body 19, and wherein a circuit board 29, 30 is mounted on said case member 18; providing an elongated seal projection 18b on the other of said cover main body 19 and said case member 18 to project rearwards or forwards; butting and fitting the seal groove 27 and the elongated seal projection 18b in a front-rear direction; bonding the seal groove 27 and the elongated seal projection 18b so that the case member 18 is fixed to the cover main body 19; and connecting the connection terminal 20 with the circuit board 29, 30 by a metallic connection member 35.

According to the above method, good sealing property is secured between the cover main body and the case member, and hence infiltration of water (vapor) contained in the atmosphere or outside water into the illumination circuit or the lamp chamber can be prevented, whereby not only can an operation failure of the illumination circuit for the light source be prevented, but also fogging of the front cover can be prevented.

Other aspects and advantages of the invention will be apparent from the following description, the drawings and the claims.

DETAILED DESCRIPTION OF THE EXEMPLARY EMBODIMENTS

A back cover and a back cover assembling method according to an exemplary embodiment of the invention will be described by reference to the accompanying drawings.

A vehicle lamp, that is, a vehicle headlamp 1, for example, is disposed at each of both left- and right-hand end portions of a front end portion of a vehicle body.

Figure 1:
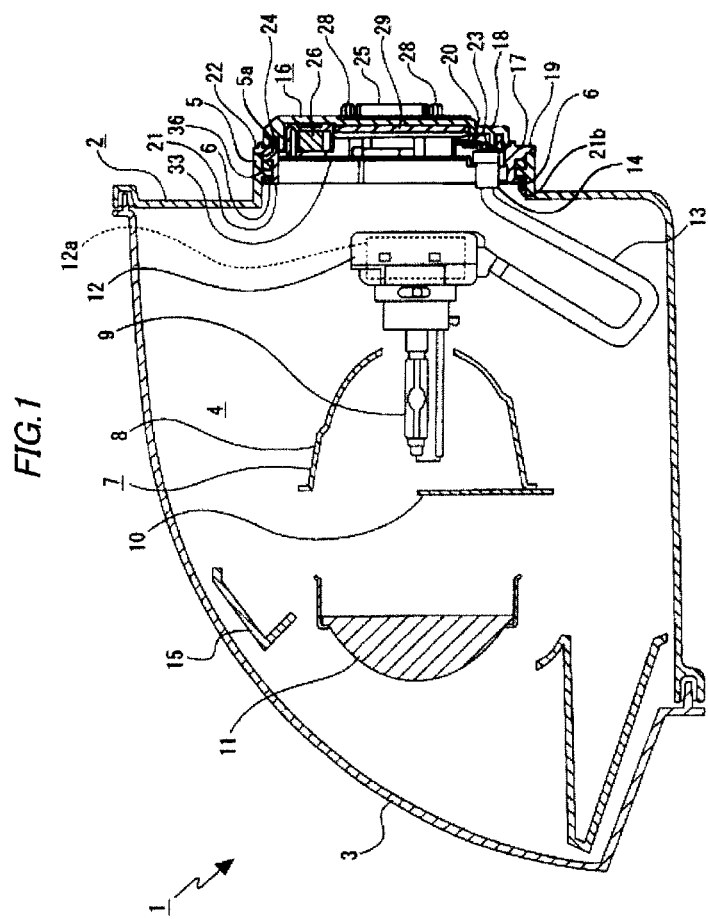
FIG. 1 is a drawing showing an exemplary embodiment of a vehicle headlamp of the invention together with FIGS. 2 to 7, which is a schematic vertical sectional view of the vehicle headlamp.

As is shown in FIG. 1, the vehicle headlamp 1 includes a lamp body 2 having a recess portion which is made to open forwards and a front cover 3 which closes a front opening of the lamp body 2, and an interior space defined by the lamp body 2 and the front cover 3 is defined as a lamp chamber 4.

Figure 2:
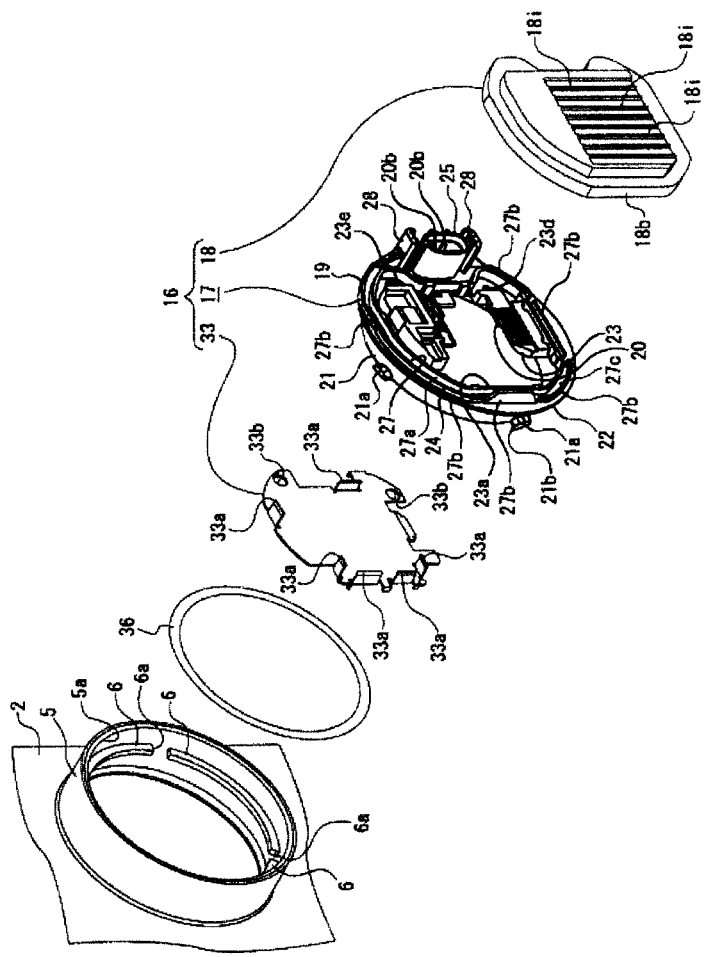
FIG. 2 is an exploded perspective view of a lamp body showing a cover mounting portion, an O ring and a back cover.

A cover mounting portion 5, which is formed into a substantially cylindrical shape, is provided at a rear end portion of the lamp body 2 (refer to FIG. 2). The cover mounting portion 5 has a mounting opening 5a which penetrates therethrough in a front-rear direction. Engagement portions 6, 6, . . . are provided on an inner surface of the cover mounting portion 5. The engagement portions 6, 6, . . . are provided so as to be spaced apart in a circumferential direction and are formed so as to extend in the circumferential direction while being caused to project radially inwards from the inner surface of the cover mounting portion 5.

Spaces between the engagement portions 6, 6, . . . are defined individually as an inserting cutouts 6a, 6a, . . . , and the inserting cutouts 6a, 6a, . . . penetrate the engagement portions 6, 6, . . . in the front-rear direction and are made to open radially inwards.

A lamp unit 7 is disposed within the lamp chamber 4 (refer to FIG. 1). The lamp unit has a reflector 8, a discharge lamp 9 which is supported on the reflector 8, a shade 10 which is mounted on the reflector and a lens 11 which is disposed in front of the discharge lamp 9.

A socket 12 is mounted at a rear end portion of the discharge lamp 9, and a starter 12a is disposed in an interior of the socket 12. A cable 13 is led out of the socket 12, and a connector 14 is coupled to an opposite end portion of the cable 13 to an end portion thereof which faces the socket 12. A fixing piece 14a, which is caused to project sideways, is provided on the connector 14, as is shown in FIG. 3, and a screw inserting hole 14b is formed in the fixing piece so as to penetrate therethrough.

An extension 15 is disposed in the lamp chamber 4 for closing part of the lamp unit 7.

A back cover 16 is mounted on the cover mounting portion 5 of the lamp body 2 to close the mounting opening 5a (refer to FIGS. 1 and 2). As is shown in FIGS. 2 and 3, the back cover 16 includes a cover member 17 and a case member 18 which is mounted on the cover member 17 and which has a function as a heat dissipating member and a function to cover the cover member 17 from the rear.

Figure 3:
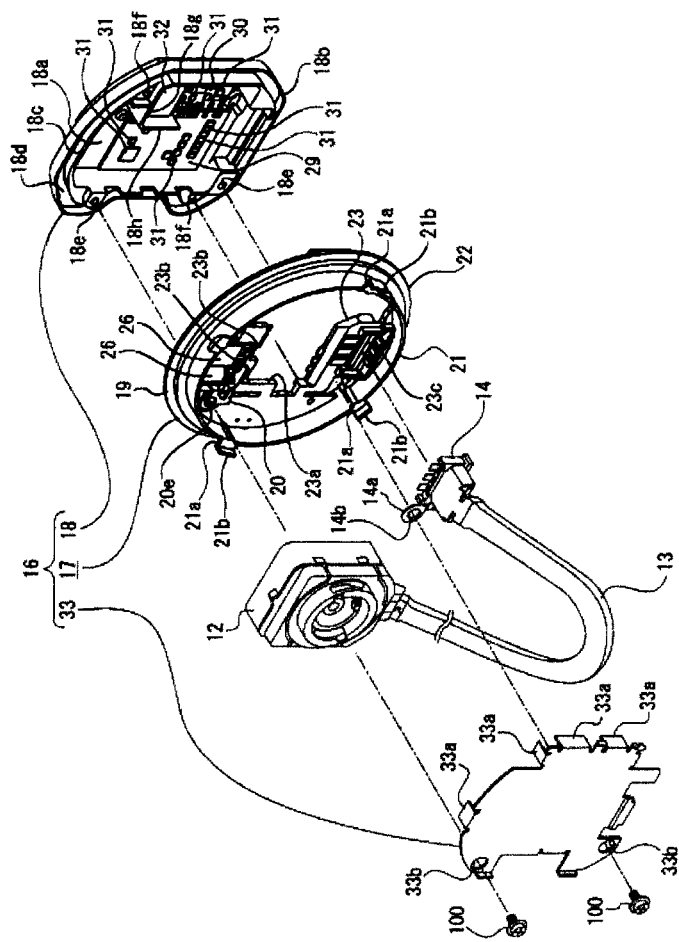
FIG. 3 is an exploded perspective view showing a socket and the back cover.
Figure 4:
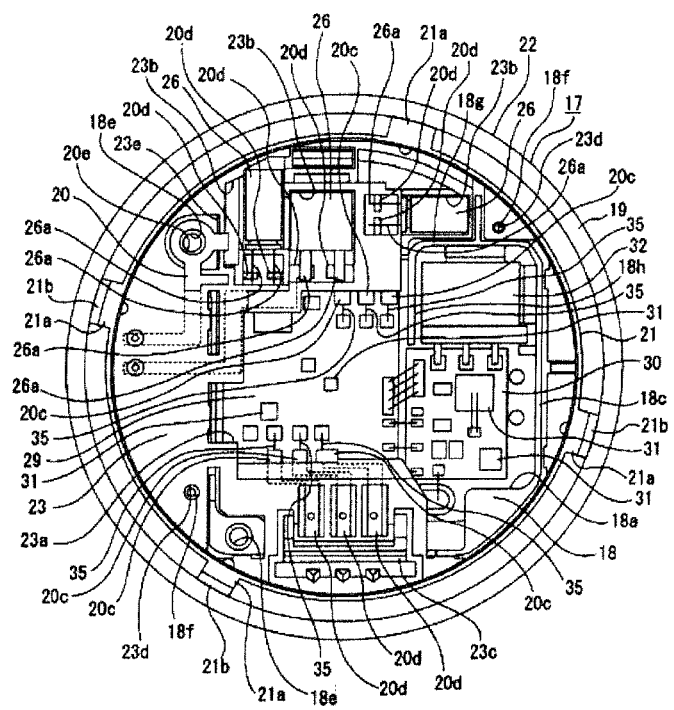
FIG. 4 is a front view showing a state in which a case member is mounted on a cover member.

The cover member 17 is made up of a cover main body 19 which is formed from a resin material and a connection terminal 20 which is formed of a metallic material, and the cover main body 19 and the connection terminal 20 are molded integrally through insert molding (refer to FIGS. 2 to 4).

The cover main body 19 has a first fitting portion 21 which has a substantially ring shape, a flange portion 22 which is caused to project radially outwards from a rear end portion of the first fitting portion 21, an inner structural portion 23 which is provided inside the flange portion 22, a second fitting portion 24 which is caused to project rearwards from a rear surface of an inner circumferential portion of the flange portion 22, and a connector frame portion 25 which is caused to project rearwards from a rear surface of the inner structural portion 23 and which is positioned on one side of the second fitting portion 24.

Engagement projecting portions 21a, 21a, . . . are provided at a front end portion of the first fitting portion 21 so as to project radially outwards. A restricting projecting portion 21b is provided at least one engagement projecting portion 21a out of the engagement projecting portions 21a, 21a, . . . so as to project forwards from an outer end portion thereof. In the back cover 16, for example, four engagement projecting portions 21a, 21a, . . . are provided, and restricting projecting portions 21b, 21b, 21b are provided individually on three engagement projecting portions 21a, 21a, 21a out of the four engagement projecting portions.

A disposition hole 23a is formed in the inner structural portion 23 so as to penetrate therethrough in a front-rear direction. Component disposing portions 23b, 23b, 23b, which are made to open forwards, and a connector connecting portion 23c are formed on a front surface of the inner structural portion 23. Large electronic components 26, 26, 26 which make up an illumination circuit (a ballast) for the discharge lamp 9 are inserted to be disposed in the component disposing positions 23b, 23b, 23b, respectively.

In the inner structural portion 23, positioning holes 23d, 23d are formed individually at an upper end portion of a left end portion and a lower end portion of a right end portion so as to penetrate the inner structural portion 23 in the front-rear direction.

An inserting hole 23e is formed at the upper end portion of the left end portion of the inner structural portion 23 so as to penetrate therethrough in the front-rear direction.

As has been described above, since the connection terminal 20 is molded integrally with the cover main body 19 through insert molding, the connection terminal 20 is embedded in the cover main body 19 excluding part thereof. Consequently, the part of the connection terminal 20 is allowed to project outwards from the cover main body 19 (refer to FIGS. 9 to 6), and the projecting part of the connection terminal 20 includes component terminal portions 20a, 20a, . . . which are positioned in interiors of the component disposition portions 23b, 23b, 23b of the inner structural portion 23, connector terminal portions 20b, 20b which are positioned in an interior of the connector frame portion 25, connecting terminal portions 20c, 20c, . . . which are caused to project from the inner structural portion 23 towards the disposition hole 23a and electric power supplying terminal portions 20d, 20d, 20d which are positioned in the connector connecting portion 23c. The component terminal portions 20a, 20a, . . . are connected individually to corresponding leads 26a, 26a, 26a of the electronic components 26, 26, 26 which are disposed individually in the component disposing portions 23b, 23b, 23b of the inner structural portion 23 trough welding.

In this way, by connecting the component terminal portions 20a, 20a, . . . individually with the leads 26a, 26a, . . . of the electronic components 26, 26, 26 through welding, not only can an improvement in connecting strength be realized, but also an improvement in conductivity to a contact resistance can be realized.

As has been described above, by disposing the large electronic components 26, 26, 26 on the cover member 17, a reduction in size of the back cover 16 can be realized which is associated with the effective use of the space on the cover member 17.

A screw inserting hole 20e is formed at an upper end portion of a right end portion of the connection terminal 20 so as to penetrate therethrough in the front-rear direction. The screw inserting hole 20e is formed in a position which corresponds to the inserting hole 23e of the inner structural portion 23 (refer to FIG. 4).

Figure 6:
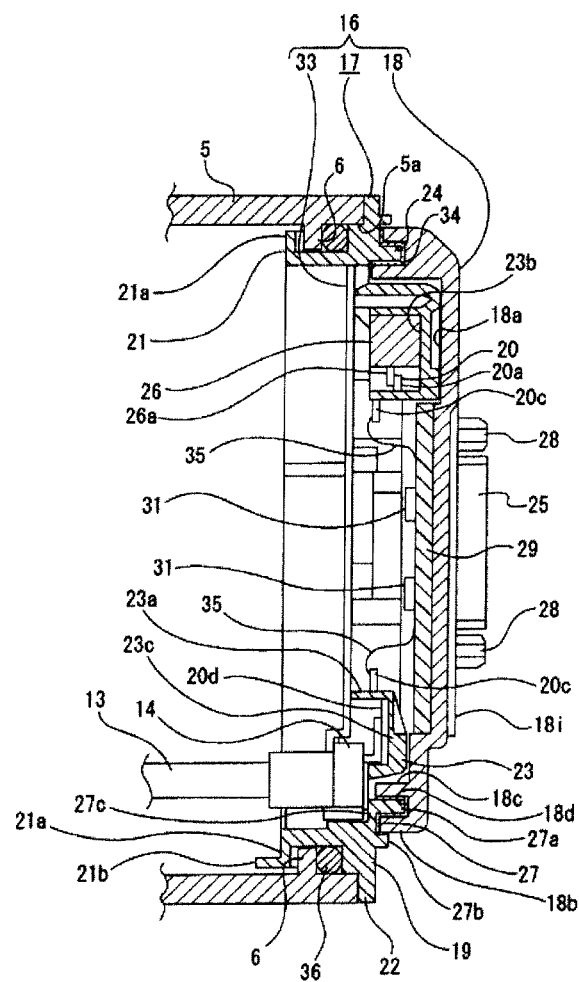
FIG. 6 is an enlarged sectional view showing a state in which a back cover is mounted on a cover mounting portion of the lamp body.

A seal groove 27 is formed on the second fitting portion 24 of the cover member 17 so as to extend in a circumferential direction while being made to open rearwards (refer to FIGS. 2 and 6). The seal groove 27 is formed by an inner wall portion 27a which is positioned inside, outer wall portions 27b, 27b, . . . which are positioned radially outside the inner wall portion 27a, and a bottom wall portion 27c which connect front end portions of the inner wall portion 27a and the outer wall portions 27b, 27b, . . . .

Rising wall portions 28, 28 are provided on both upper and lower sides of the connector frame portion 25 on a rear surface of the connector member 17 so as to project rearwards.

The case member 18 has the function as the heat dissipating member and is formed of a metallic material. The case member 18 is formed into a flat shape in the front-rear direction and has a shallow mounting recess portion 18a which is made to open forwards (refer to FIGS. 2, 3 and 6).

An elongate seal projection 18 is provided along a circumferential portion on a front surface of the case member 18 so as to extend in a circumferential direction while being caused to project forwards. An inner circumferential wall 18c is provided inside the elongated seal projection 18b on the case member 18, and the inner circumferential wall 18c extends in the circumferential direction while being caused to project forwards. Consequently, a groove portion 18d, which is made to open forwards, is defined between the elongated seal projection 18b and the inner circumferential wall 18c.

Screwing holes 18e, 18e are formed in the case member 18 in the vicinity of the inner circumferential wall 18c so as to be spaced apart vertically (refer to FIGS. 3 and 4). Positioning pins 18f, 18f are provided individually at an upper end portion of a left end portion and a lower end portion of a right end portion, and the positioning pins 18f, 18f are each caused to project forwards.

A first shield well 18g and a second shield well 18h are provided on the case member 18. The first shield wall 18g extends in a left-right direction to reach the inner circumferential wall 18c at a left end portion thereof and the second shield wall 18h extends in a vertical direction to reach a right end portion of the first shield wall 18g at an upper end portion thereof.

Circuit boards 29, 30 are disposed in a mounting recess portion 18a of the case member 18 side by side in the left-right direction. A required number of chip components 31, 31, . . . are mounted on front surfaces of the circuit boards 29, 30.

Rear surfaces of the circuit boards 29, 30 are formed individually into flat planes, and the circuit boards 29, 30 are disposed in the mounting recess portion 18a in such a state that the respective rear surfaces of the circuit boards 29, 30 are in surface contact with the case member 18.

In this way, in the back cover 16, since the chip components 31, 31, . . . are mounted on the front surfaces of the circuit boards 29, 30 and the circuit boards 29, 30 are disposed in the mounting recess portion 18a in such a state that the rear surfaces, which are made into the flat planes, of the circuit boards 29, 30 are in surface contact with the case member 18, there is provided a high heat transfer coefficient for heat generated in the circuit boards 29, 30, thereby making it possible to realize an improvement in heat dissipating performance of the back cover 16.

An electronic component (a DC-DC converter) 32, which makes up the illumination circuit, is mounted in the mounting recess portion of the case member 18, and a terminal portion of the electronic component 32 is connected to the circuit board 30. The electronic component 32 is a component having a large heat value.

By the electronic component 32 having the large heat value being disposed on the case member 18 which functions as the heat dissipating member, an improvement in the heat dissipating performance of the back cover 16 can be realized.

The electronic component 32 is disposed while being surround from four sides by the first shield wall 18g, the second shield wall 18h, part of the inner circumferential wall 18c and part of a wall portion which forms the mounting recess portion 18a and which is oriented in the front-rear direction. Consequently, effects of noise that is generated when the electronic component 32 is driven on the circuit boards 29, 30 and the chip components 31, 31 can be reduced.

Figure 5:
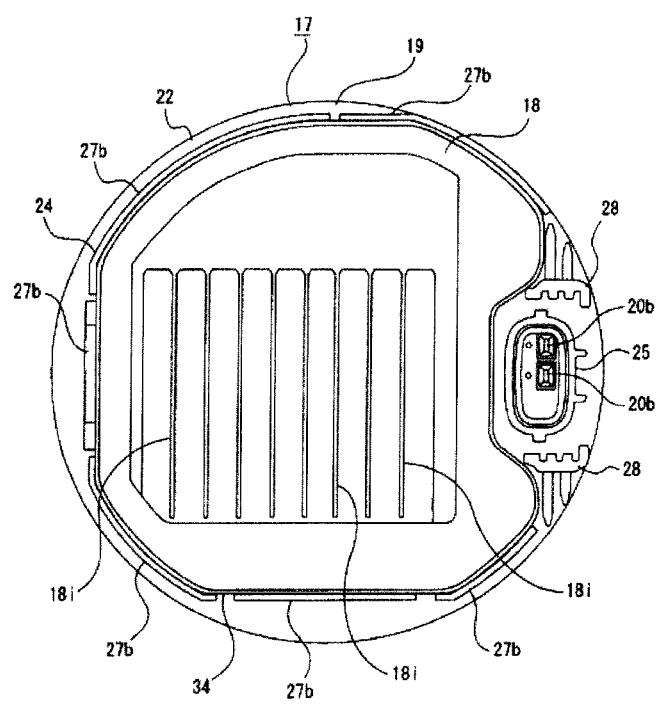
FIG. 5 is a rear view showing the state in which the case member is mounted on the cover member.

Heat dissipating fins 18i, 18i, . . . are provided on a rear surface of the case member 18 (refer to FIGS. 5 and 6). The heat dissipating fins 18i, 18i, . . . are formed directly behind the circuit boards 29, 30 and the electronic component 32, so as to improve the heat dissipating performances of the circuit boards 29, 30 and the electronic component 32.

A shield plate 33, which is formed from a metallic material, is mounted on a front side of the cover member 17 (refer to FIGS. 2, 3 and 6). Engagement pieces 33a, 33a, . . . are provided on an outer circumferential portion of the shield plate 33 so as to be spaced apart in a circumferential direction while being caused to project rearwards. Screw inserting holes 33b, 33b are formed in the shield plate 33 so as to be spaced apart vertically while being caused to penetrate therethrough in the front-rear direction.

Radiation from the illumination circuit is stopped by the shield plate 33 so as to realize a reduction in noise.

Hereinafter, an assembling method of the back cover 16 will be described.

Firstly, the case member 18 is mounted on the cover member 17. Mounting of the case member 18 on the cover member 17 is implemented by filling an adhesive 34 in the seal groove 27 formed in the cover main body 19 and inserting the elongated seal projection 18b in the seal groove 27 to thereby join the case member 18 to the cover main body 19. As this occurs, the positioning pins 18f, 18f of the case member 18 are inserted individually into the corresponding positioning holes 23d, 23d in the cover member 17 for positioning of the case member 18 relative to the cover member 17.

As is described above, by providing the positioning pins 18f, 18f on the case member 18 and forming the positioning holes 23d, 23d in the cover member 17 for positioning the case member 18 relative to the cover member 17, an improvement in positioning accuracy with which the case member 18 is positioned relative to the cover member 17 can easily be realized.

As will be described later, when mounting or dismounting the back cover 16 on or from the vehicle headlamp 1, although the back cover 16 is rotated relative to the cover mounting portion 5 of the vehicle headlamp 1, by inserting the positioning pins 18f, 18f into the positioning holes 23d, 23d in the way described above, rotation of the case member 18 relative to the cover member 17 is prevented when the back cover 16 is rotated, thereby making it possible to prevent the case member 18 from falling from the cover member 17.

The elongated seal projection 18b is bonded to the seal groove 27 by the adhesive 34, whereby the case member 18 is fixed to the cover member 17. In such a state that the case member 18 is fixed to the cover member 17, no gap is produced between the seal groove 27 and the elongated seal projection 18b, whereby sealing property therebetween is ensured.

Although the example has been described above in which the adhesive 34 is filled in the seal groove 27, in contrast to this, the adhesive 34 may be applied to the elongated seal projection 18b for the case member 18 to be fixed to the cover member 17. In addition, the adhesive 34 may be not only filled in the seal groove 27 but also applied to the elongated seal projection 18b for the seal groove 27 and the elongated seal projection 18b to be bonded together, so that the case member 18 is fixed to the cover member 17.

In such a state that the case member 18 is fixed to the cover member 17, the circuit boards 29, 30 and the electronic component 32 are positioned in the disposition hole 23a formed in the cover member 17 (refer to FIG. 6). Consequently, the space in the interior of the back cover 16 can be used effectively, thereby making it possible to make the back cover 16 thin.

Next, in such a state that the case member 18 is fixed to the cover member 17, the connecting terminal portions 20c, 20c, . . . of the connection terminal 20 are connected individually to circuit patterns formed on the circuit boards 29, 30 through wire bonding or by connecting members 35, 35, . . . such as metallic ribbons. By the connecting terminal portions 20c, 20c, . . . being connected to the circuit patterns formed on the circuit boards 29, 30, the electronic components 26, 26, 26 which are disposed individually in the component disposing portions 23b, 23b, 23b are connected to the circuit patterns on the circuit boards 29, 30 via the connection terminal 20.

Next, the connector 14 is connected to the electric power supplying terminal portions 20d, 20d, 20d of the connection terminal 20.

Following this, the shield plate 33 is mounted on front surface sides of the cover member 17 and the case member 18. Mounting the shield plate 33 on the cover member 17 is implemented by the engagement pieces 33a, 33a, . . . of the shield plate 33 being brought individually into engagement with an opening edge of the mounting recess portion 18a of the case member 18 via the disposition hole 23a and further being screwed to the case member 18.

The shield plate 33 is screwed to the case member 18, as is shown in FIG. 3, by inserting one metallic mounting screw 100 sequentially through one screw inserting hole 33b in the shield plate 33 and the screw inserting hole 20e in the connection terminal 20 to be screwed into one screwing hole 18e in the case member 18 and inserting the other mounting screw 100 sequentially through the other screw inserting hole 33b in the shield plate 33 and the screw inserting hole 14b in the connector 14 to be screwed into the other screwing hole 18e in the case member 18.

The back cover 16 is made up by screwing the shield plate 33 to the case member 18 in the way described above.

By joining the metallic shield plate 33, part of the metallic connection terminal 20 and the metallic case member 18 together by the metallic mounting screws 100, 100 in the way described above, generation of electromagnetic noise in the back cover 16 can be reduced.

Since, by part of the connection terminal 20 and the case member 18 being joined together by the mounting screws 100, 100, the case member 18 is fixed to the cover member 17 through screwing in addition to bonding by the adhesive 39, an improvement in fixing strength with which the case member 18 is fixed to the cover member 17 can be realized.

Following this, An O ring 36 is fitted on an outer circumferential surface of the first fitting portion 21 of the cover main body 19 (refer to FIGS. 2 and 6). As this occurs, although there is a fear that the O ring 36 comes into contact with the engagement projecting portions 21a, 21a, . . . which are caused to project radially outwards, since the engagement projecting portions 21a, 21a, . . . are formed not of a metallic material but from the resin material, even in the event that the O ring 36 comes into contact with the engagement projecting portions 21a, 21a, . . . , the O ring 36 can be prevented from being damaged by the contact.

With the O ring 36 fitted on the first fitting portion 21 and the engagement projecting portions 21a, 21a, . . . inserted individually in the inserting cutouts 6a, 6a, . . . which are formed between the engagement portions 6, 6, . . . , the cover member 17 is rotated in the circumferential direction. When the cover member 17 is rotated, as is shown in FIG. 6, rear surfaces of the engagement projecting portions 21a, 21a, . . . are brought individually into engagement with front surfaces of the engagement portions 6, 6, . . . , whereby the back cover 16 is mounted on the cover mounting portion 5 of the lamp body 2, and the O ring 36 is closely attached to the engagement portions 6, 6, . . . of the lamp body 2 and the flange portion 22 of the back cover 16.

When the back cover 16 is attempted to be mounted on the cover mounting portion 5, for example, in the event that the back cover 16 is inclined relative to the cover mounting portion 5, depending upon an inclination angle of the back cover 16, the restricting projecting portions 21b which are provided on the engagement projecting portions 21a come into contact with rear surfaces of the engagement portions 6 or opening edges of the inserting cutouts 6a. Consequently, in the event that the back cover 16 is not properly oriented relative to the cover mounting portion 5 in the way described above, the insertion of the engagement projecting portions 21a, 21a, . . . into the inserting cutouts 6a, 6a, . . . is restricted by the restricting projecting portions 21b, whereby the back cover 16 cannot be mounted on the cover mounting portion 5.

In contrast, when the back cover 16 is attempted to be mounted on the cover mounting portion 5, even though the back cover 16 is inclined relative to the cover mounting portion 5, there is a possibility that the engagement projecting portions 21a, 21a, . . . are allowed to be inserted individually into the corresponding inserting cutouts 6a, 6a, . . . . However, as this occurs, even though the back cover 16 attempts to rotate in the circumferential direction relative to the cover mounting portion 5, since the back cover 16 is inclined, the restricting projecting portions 21 come into contact with the opening edges of the inserting cutouts 6a, whereby the back cover 16 is prevented from rotating. Consequently, in this case, too, the back cover 16 is not allowed to be mounted on the cover mounting portion 5.

In the back cover 16 as described above, by providing the restricting projecting portions 21b on the engagement projecting portions 21a, the back cover 16 can be prevented from being mounted on the cover mounting portion 5 in an incomplete condition when the back cover 16 is oriented improperly relative to the cover mounting portion. Namely, the back cover 16 can be prevented from being mounted on the cover mounting portion 5 in the incomplete condition in which only part of the engagement projecting portions 21a are inserted in the inserting cutouts 6a, while the other engagement projecting portions 21a are not inserted in the inserting cutouts 6a.

Although in this embodiment, the restricting projecting portion 21b is described as being provided on at least one of the engagement projecting portions 21a, in the back cover 16, a configuration can be adopted in which no restricting projecting portion 21b is provided on any of the engagement projecting portions 21a, 21a, . . . .

In the vehicle headlamp 1 configured as has been described heretofore, since the back cover 16 is configured as the single integral unit in which the case member 18 is mounted on the cover member 17 on which the electronic components 26, 26, 26, the electronic component 32 and the chip components 31, 31, . . . are disposed and is then mounted on the lamp body 2, not only can the facilitation in assembling the respective portions of the vehicle headlamp 1 be realized, but also the detachment and attachment of the back cover 16 can easily be performed when discharge lamps 9 are replaced.

Since the sealing property between the back cover 16 and the cover mounting portion 5 of the lamp body 2 is ensured by the O ring 36, infiltration of water (vapor) contained in the atmosphere or outside water into the lamp chamber 4 can be prevented.

Figure 7:
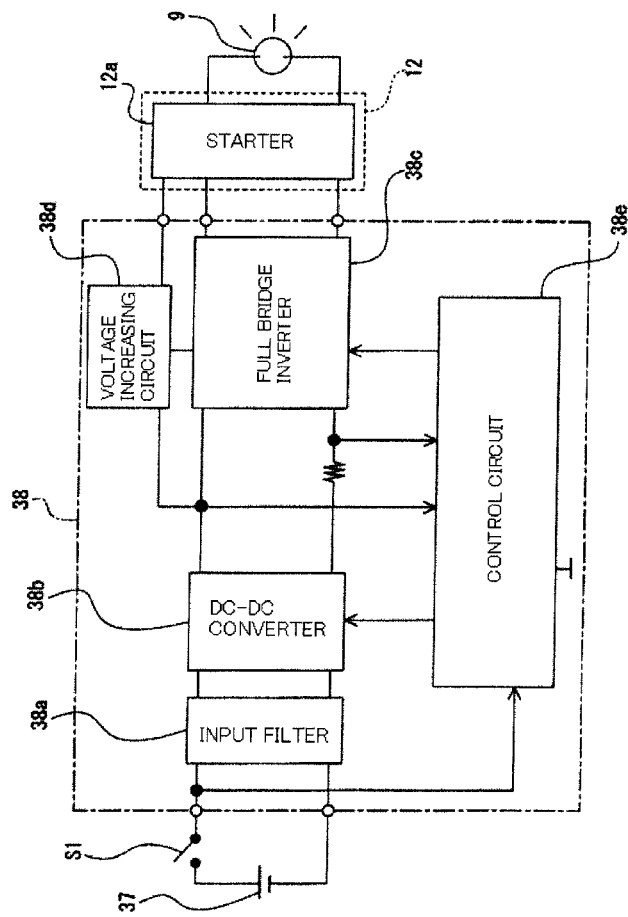
FIG. 7 is a block diagram showing an illumination circuit (a ballast) of a discharge lamp.

Hereinafter, an example of an illumination circuit (a ballast) for the discharge lamp 9 will be described (refer to FIG. 7).

An input filter 38a which is connected to a direct current power supply 37 via a switch S1 suppresses noise generated from a ballast 38 and noise attempting to infiltrate into the ballast 38.

A DC-DC converter 38b (the electronic component 32), which is a direct current-direct current converter circuit connected to the input filter 38a, receives a direct current input voltage from the direct current power supply 37 via the input filter 38a to raise the input voltage to a desired direct current voltage.

In the DC-DC converter 38b, a switching element in an interior thereof is driven by a control signal from a control circuit 38e.

A full bridge inverter 38c, which is a direct current-alternating current conversion circuit, first converts an output voltage of the DC-DC converter 38b into an alternating current voltage (a square wave) and then supplies the alternating current voltage to the discharge lamp 9. In the full bridge inverter 38c, for example, two arms are configured by four switching elements and includes driving circuits for driving individually the switching elements of each arm. The full bridge inverter 38c outputs an alternating current by on/off controlling the two pairs of switching elements in a conflicting fashion. The switching elements in an interior of the full bridge inverter 38c are driven by a control signal from a control circuit 38e.

A voltage increasing circuit 38d imparts an increased voltage to a starter 12a. When activated, the starter 12a generates a high voltage pulse (for example, about 25 kV).

The control circuit 38e controls the illumination of the discharge lamp 9 (a transient/constant power control). Conceptually, the control circuit 38e also includes a fail-safe circuit for detecting abnormal inputs and outputs and controlling ceasing of the operation.

As has been described heretofore, in the vehicle headlamp 1, the seal groove 27, which is made to open rearwards, is formed on the cover member 17, and the elongated seal projection 18b is provided on the case member 18 so that the elongated seal projection 18b is bonded to be mounted in the seal groove 27 while being fitted in the seal groove 27.

Consequently, good sealing property is secured between the cover member 17 and the case member 18, and hence infiltration of water (vapor) contained in the atmosphere or outside water into the illumination circuit or the lamp chamber 4 can be prevented, whereby not only can an operation failure of the illumination circuit for the light source be prevented, but also fogging of the front cover 3 can be prevented.

Since good sealing property is secured between the cover member 17 and the case member 18 to thereby improve the mounting strength between both the members, the generation of looseness of the case member 18 relative to the cover member 17 or the generation of a drawback that the case member 18 falls from the cover member 17 can be prevented.

Since the cover member 17 is formed by integrally molding the connection terminal 20 and the cover main body 19, the number of components of the vehicle headlamp 1 can be reduced.

In the back cover 16, since the rising wall portions 28, 28 are provided on the outer circumferential side of the connector frame portion 25 of the cover member 17, the hands of an assembler or other surrounding objects are never brought into contact with the connector frame portion 25 and the connector terminal portions 20b, 20b which are positioned in the interior of the connector frame portion 5 when the back cover 16 is mounted on the cover mounting portion 5 of the lamp body 4 or the vehicle lamp 1 is mounted on a vehicle body, thereby making it possible to prevent any damage to the connector frame portion 25 and the connector terminal portions 20b, 20b.

In addition, when the back cover 16 is rotated to be mounded on or dismounted from the cover mounting portion 5, the rising wall portions 28, 28 can be made use of as operating knobs for use by the assembler, thereby making it possible to realize an improvement in working properties in mounting or dismounting the back cover 16 on or from the cover mounting portion 5.

In the embodiment described above, although the seal groove 27 is described as being formed on the cover member 17 and the elongated seal projection 18b is described as being provided on the case member 18, on the contrary, a configuration may be adopted in which an elongated seal projection is provided on the cover member, while a seal groove is formed on the case member, so that the case member 18 is fixed to the cover member 17.

In the vehicle headlamp 1, although the cover main body 19 is formed from the resin material, it is possible to suppress noise associated with the illumination circuit by forming a cover main body 19 using a conductive material and a non-conductive material through a so-called two-color molding so that part of the cover main body 19 is made up of the conductive material, thereby making it possible to suppress noise associated with the illumination circuit.

In the above embodiment, the starter 12a is described as being disposed on the discharge lamp 9 side (in the interior of the socket 12) within the lamp chamber 4. However, the disposing position of the starter 12 is not limited to that position, and hence, for example, the starter may be disposed on the illumination circuit side (in the interior of the back cover 16).

In the embodiment described above, the vehicle headlamp 1 utilizing the discharge lamp 9 is described as the example of the vehicle lamp. However, as the vehicle lamp, for example, in addition to the vehicle headlamp 1, a daytime running lamp, a tail and stop combination lamp, a turn indicator or the like can be used.

The light source is not necessarily limited to the discharge lamp 9. For example, a filament type bulb or a semiconductor light emitting device such as an LED (Light Emitting Diode) can be used as a light source.

The illumination circuit disposed in the back cover 16 may be such as to have functions to turn on and off the light source and to change (or adjust) the brightness of the light source in addition to the function to illuminate the light source at a predetermined brightness.

While description has been made in connection with a specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 1 vehicle headlamp; 2 lamp body; 3 front cover; 4 lamp chamber; 5 cover mounting portion; 5a mounting opening; 6 engagement portion; 6a inserting cutout; 9 discharge lamp (light source); 16 back cover; 14 connector; 18 case member; 18a mounting recess portion; 18b elongated seal projection; 18e screwing hole; 18f positioning pin; 19 cover main body; 20 connection terminal; 20b connector terminal portion; 20d electric power supplying terminal portion; 20e screw inserting hole; 21 first fitting portion; 21b restricting projecting portion; 24 second fitting portion; 25 connector frame portion; 26 electronic component; 26a lead; 27 seal groove; 28 rising wall portion; 29 circuit board; 30 circuit board; 31 chip component; 32 electronic component; 33 shield plate; 35 connecting member; 100 mounting screw.

What is claimed is:

1. A back cover to be attached to a cover mounting portion of a vehicle lamp in which a light source is disposed in a lamp chamber defined by a lamp body on which said cover mounting portion having a mounting opening is provided at a rear end portion of the lamp body and a front cover which covers a front of the lamp body, the back cover comprising:

a cover main body formed from a resin material and including a first fitting portion provided on a front end side of the cover main body and adapted to fit in the cover mounting portion and a second fitting portion provided on a rear end side of the cover main body;

a connection terminal formed of a metallic material and partially embedded in the cover main body so as to be integrally formed with the cover main body;

a metallic case member fitted in the second fitting portion and including a mounting recess portion made to open forwards;

a circuit board disposed within the mounting recess portion and connected with the connection terminal;

an electronic component disposed within the mounting recess portion and connected with the circuit board;

a power supply terminal portion provided on a part of the connection terminal and adopted to be connected with a light source side connector for supplying electric power to the light source;

a connector terminal portion provided on another part of the connection terminal and adapted to be connected with a power supply side connector for receiving electric power from a power supply side;

a connector frame portion provided on the cover main body and adopted to cover the connector terminal portion from a circumference of the connector terminal portion;

a seal groove formed on one of the second fitting portion and the case member to open forwards or rearwards and extending in a circumferential direction; and an elongated seal projection formed on the other of the second fitting portion and the case member to project rearwards or forwards and extending in the circumferential direction, wherein the elongated seal projection is fixed to the seal groove in a condition where the elongated seal projection is fitted in the seal groove and bonded to the seal groove.

2. The back cover according to claim 1, further comprising:
a rising wall portion provided on an outer circumferential side of the connector frame portion and covering at least a part of a circumference of the connector frame portion.

3. The back cover according to claim 1, further comprising:
an insertion hole formed in the cover main body and penetrating through the cover main body in a front-rear direction;

a screw inserting hole formed in the connection terminal and positioned in association with the insertion hole;

a screwing hole formed in the case member and positioned in association with the insertion hole; and a metallic shield plate adapted to cover the connection terminal from a front thereof, wherein the shield plate is fixed to the case member by a screw which is inserted through the screw inserting hole and the insertion hole to be screwed into the screwing hole.

4. The back cover according to claim 1, further comprising:
a component disposing portion provided in the cover member; and an electronic component having a lead and disposed in the component disposing portion, wherein the lead of the electronic component is connected to the connection terminal by welding.

5. The back cover according to claim 1, further comprising:
a positioning hole formed in the cover main body; and a positioning pin provided on the case member and inserted in the positioning hole.

6. The back cover according to claim 1, further comprising a chip component mounted on one surface of the circuit board, wherein the other surface of the circuit board is formed into a flat plane, and the circuit board is mounted on the case member, and the other surface of the circuit board is in surface contact with the case member.

7. The back cover according to claim 1, further comprising:
a plurality of engagement projecting portions provided at a front end portion of the first fitting portion so as to be positioned spaced apart from each other in a circumferential direction, wherein the cover mounting portion of the lamp body includes a plurality of inserting cutouts into which the plurality of engagement projecting portions are inserted individually from a rear thereof and a plurality of engagement portions with which the plurality of engagement projecting portions are brought into engagement when the cover main body is rotated in the circumferential direction in such a state that the plurality of engagement projecting portions are inserted individually into the plurality of inserting cutouts from the rear thereof; and a restricting projecting portion projecting forwards and provided at least one of the plurality of engagement projecting portions.

8. A method of assembling a back cover to be attached to a cover mounting portion of a vehicle lamp in which a light source is disposed in a lamp chamber defined by a lamp body on which said cover mounting portion having a mounting opening is provided at a rear end portion of the lamp body and a front cover which covers a front of the lamp body, the method comprising:

providing a seal groove on one of a cover main body and a metallic case member to open forwards or rearwards, wherein said cover main body is integrally molded with a connection terminal made of a metallic material in such a state that the connection terminal is mostly embedded in the cover main body, and wherein a circuit board is mounted on said case member;

providing an elongated seal projection on the other of said cover main body and said case member to project rearwards or forwards;

butting and fitting the seal groove and the elongated seal projection in a front-rear direction;

bonding the seal groove and the elongated seal projection so that the case member is fixed to the cover main body; and connecting the connection terminal with the circuit board by a metallic connection member.

* * * * *